United States Patent
Soma

(10) Patent No.: US 6,342,009 B1
(45) Date of Patent: Jan. 29, 2002

(54) INPUT DEVICE FOR GAME MACHINE

(75) Inventor: Masahiro Soma, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/431,814

(22) Filed: Nov. 2, 1999

(30) Foreign Application Priority Data

Nov. 4, 1998 (JP) .......................................... 10-313796

(51) Int. Cl.⁷ ........................... A63F 13/00; A63F 9/24; G06F 17/00; G06F 19/00
(52) U.S. Cl. ........................... 463/38; 463/36; 463/37; 463/46; 463/47; 273/148 R; 273/148 B; 345/156; 345/184
(58) Field of Search ............................. 463/38, 36, 37, 463/46, 47; 273/148 R, 148 B, 459, 460, 461; 345/154, 156, 157, 184, 161

(56) References Cited

U.S. PATENT DOCUMENTS

| | | | |
|---|---|---|---|
| 4,401,304 A | * 8/1983 | Hamano | 273/85 G X |
| 4,469,330 A | 9/1984 | Asher | |
| 4,820,908 A | * 4/1989 | Wei | 235/245 R X |
| 4,849,583 A | * 7/1989 | Meyer | 200/6 A X |
| 4,864,272 A | * 9/1989 | Cecchi et al. | 338/128 |
| 4,949,080 A | * 8/1990 | Mikan | 340/711 X |
| 5,026,058 A | * 6/1991 | Bromley | 273/93 C X |
| 5,485,171 A | * 1/1996 | Copper et al. | 345/160 X |
| 5,531,443 A | 7/1996 | Cruz | |
| 5,644,113 A | * 7/1997 | Date et al. | 200/5 R X |
| 5,645,277 A | * 7/1997 | Cheng | 273/148 B |
| 5,700,194 A | * 12/1997 | Hsien | 463/37 X |
| 5,716,274 A | 2/1998 | Goto et al. | |
| 5,759,100 A | * 6/1998 | Nakanishi | 463/37 X |
| 5,874,906 A | * 2/1999 | Willner et al. | 341/22 X |
| 6,153,843 A | * 11/2000 | Date et al. | 200/339 X |

FOREIGN PATENT DOCUMENTS

| | | |
|---|---|---|
| JP | 0 90 50 344 | 2/1997 |
| JP | 10-134662 | 5/1998 |

* cited by examiner

Primary Examiner—Jessica J. Harrison
Assistant Examiner—Binh-An D. Nguyen
(74) Attorney, Agent, or Firm—Brinks Hofer Gilson & Lione

(57) ABSTRACT

In the input device, which inputs signals to a game machine using a computer, one or more operating members are provided on each of plural outer surfaces of housing members, a filmy substrate having flexibility is bent in conformity with the insides of the plural surfaces of the housing member, contact portions adapted to perform ON-OFF operation in response to operations of the operating members are formed respectively on the bent surfaces of the substrate, and when the operating members are operated, signals corresponding respectively to operations of the operating members are inputted to the game machine.

20 Claims, 4 Drawing Sheets

INPUT DEVICE FOR GAME MACHINE

BACKGROUND OF THE INVENTION

1. Field of the Invention

The present invention relates to an input device for a computerized game machine. In particular, the input device permits a player of the game machine to enjoy a game with a sense of presence in a real-time manner on a display screen of the game machine by operating operating members such as operating keys, operating buttons, or operating levers.

2. Description of the Related Art

In recent years, computerized game machines (hereinafter referred to simply as "game machine") have become more and more popular and increasingly quick tempoed. The game player can enjoy a game on a display screen of the game machine by operating various operating members such as operating keys, operating buttons and operating levers that correspond to a game software program prestored or inputted for each game. Software programs for use in such a game machine have heretofore been provided, including roll play type programs, speed game type programs, fight-interaction type, and creation-upbringing type.

For example, in the case where an ordinary general-purpose computer is used as a game machine by storing a game software program in advance or by inputting it for every game, a keyboard or a mouse is typically used as an input device. However, in the case of a game machine dedicated to game playing an input device to be operated by a game operator that is separated from the game machine, such as a controller exclusive for games or one called a joy stick, is typically used.

This input device is a controller having a multi-surface switch in which cross keys, key tops and selection keys are provided on the upper surface of a case having a shape of a generally rectangular parallelepiped, and one or more button keys are provided on each of right- and left-hand sides of the front surface. Further, on the inner side of the case upper surface is typically disposed a printed circuit board having contact patterns connected to the cross keys, key tops and selection keys. On the inner side of the front surface is typically disposed a second printed circuit board having contact patterns connected to the button keys. These printed circuit boards are electrically connected with each other and are each connected to the game machine by a cable through a connector. There also is available a type of input device in which such printed circuit boards are connected to the game machine by wireless without using cable (i.e. wireless).

For operating this input device, the game player is required to hold both sides of the case with the palms of both right and left hands, placing the thumb of the right hand on a cross key (or a key top), and the thumb of the left hand on a key top (or a cross key). The forefinger and the middle finger of both right and left hands are placed on button keys. The various keys are manipulated with the fingers as the game proceeds, whereby the game player can enjoy the game projected on the display screen.

In the above conventional input device, because the printed circuit boards are disposed on both upper and front surfaces of the case, there are limitations in the thickness of each printed circuit board, thus giving rise to the problem that a further reduction in the thickness of the printed circuit board is difficult.

There also has been the problem that the reduction in size, thickness and weight of the input device is difficult because a number of fixing means are necessary for fixing the printed circuit boards to the case.

SUMMARY OF THE INVENTION

The present invention has been accomplished in view of the above-mentioned problems and it is an object of the invention to provide an input device for a game machine that overcomes the above-mentioned problems and is capable of being reduced in size, thickness and weight.

The input device according to the present invention inputs signals to a computerized game machine. The input device is characterized in that one or more operating members are provided on each of a plurality of outer surfaces of a housing, that a filmy substrate having flexibility is bent in conformity with the insides of the plural surfaces of the housing, that contact portions adapted to perform an ON-OFF operation in response to operations of the operating members are formed respectively on the bent surfaces of the substrate at positions corresponding to the operating members, and that when the operating members are operated, signals corresponding respectively to operations of the operating members are inputted to the game machine.

According to this construction, it is possible to make the substrate smaller in thickness and weight than the conventional printed circuit boards and it becomes possible to reduce the size, thickness and weight of the entire device.

In addition, since it suffices to use only one filmy substrate having flexibility, it is, unlike the prior art, no longer necessary to connect plural printed circuit boards electrically and hence the number of portions to be connected decreases. As a result, failures based on electrical connections decrease and reliability is improved.

In the input device for a game machine according to the present invention, a positioning means for positioning the substrate may be provided on the inner surface of the housing. According to this construction, it becomes easy to effect positioning of the substrate relative to the housing and there no longer is any fear of a positional deviation of the substrate.

In the input device for a game machine according to the present invention, the positioning means may comprise one or more projections formed on the inner surface of the housing, and holes for insertion therein of the projections may be formed in the substrate at positions corresponding to the projections. According to this construction, it becomes easier to effect positioning of the substrate. In the input device for a game machine according to the present invention, there may be provided a fixing member for urging and fixing the substrate to the inner surface of the housing. According to this construction, the substrate is fixed to the housing inner surface by the fixing member and hence there no longer is any fear of a positional deviation of the substrate.

In the input device for a game machine according to the present invention, any one of the housing, the flexible filmy substrate and the fixing member may be removably provided with support members which support one or more bent surfaces of the substrate substantially perpendicular to the other surfaces adjacent thereto. According to this construction, it is possible to support one or more bent surfaces of the substrate at predetermined positions in a nearly perpendicular condition relative to the other surfaces adjacent thereto.

In the input device for a game machine according to the present invention, the other surfaces of the substrate may be formed with anti-rebound lugs extending toward the lower portions of the one or more bent surfaces of the substrate and toward the lower portions of the support members for supporting the bent surfaces. According to this construction, the one or more bent surfaces of the substrate and the support members which support them are prevented by the aforesaid lugs from returning to a single plane under the action of the elastic force which the substrate possesses and are thereby prevented from rebounding.

In the input device for a game machine according to the present invention, the housing may comprise a first case member and a second case member which are divided from each other, and a wall portion for preventing the influence of static electricity on a wiring portion of the substrate may be provided inside a connection between the first and second case members. According to this construction, the substrate wiring portion can be prevented from being affected by static electricity and hence it is possible to prevent a malfunction attributable to static electricity.

DETAILED DESCRIPTION OF A PREFERRED EMBODIMENT

An input device for a game machine according to an embodiment of the present invention will be described hereinunder with reference to the accompanying drawings.

Figure 1:
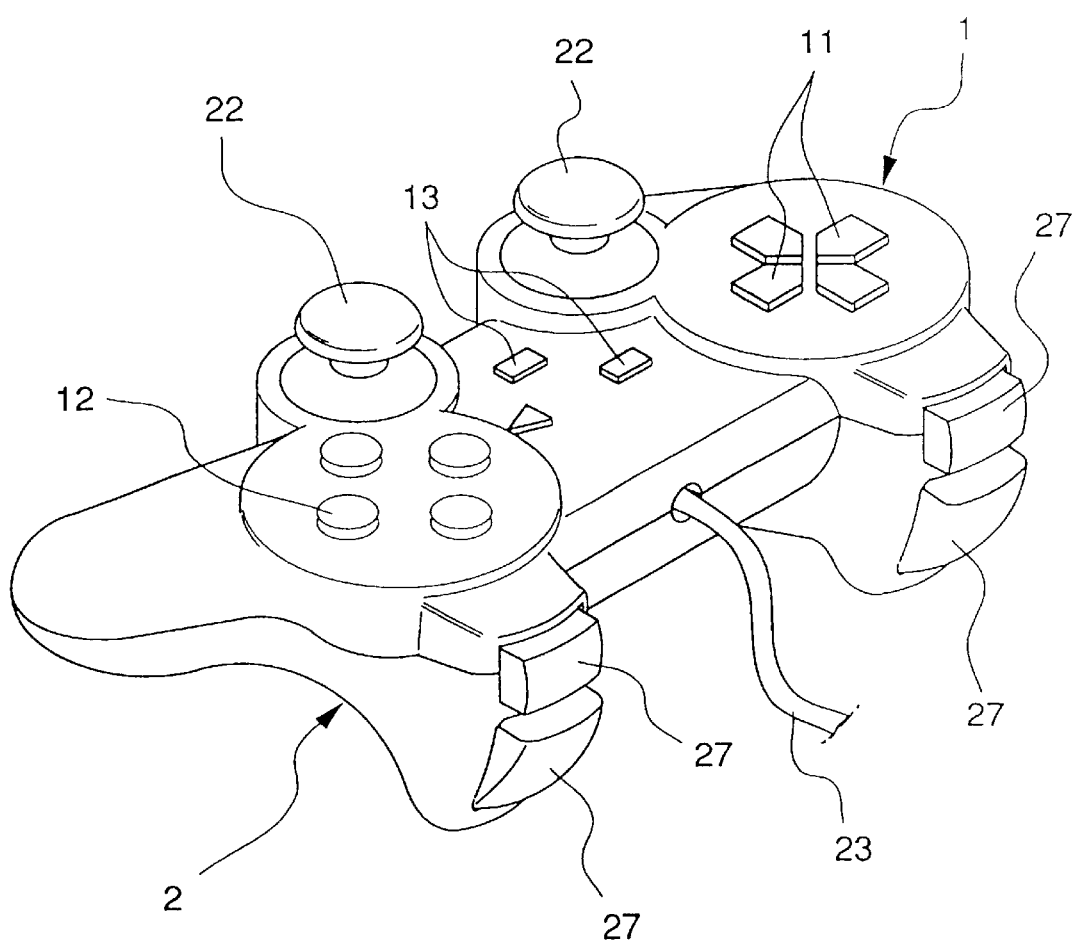
FIG. 1 is a perspective view of a controller for use in a computer game machine according to an embodiment of the present invention.
Figure 2:
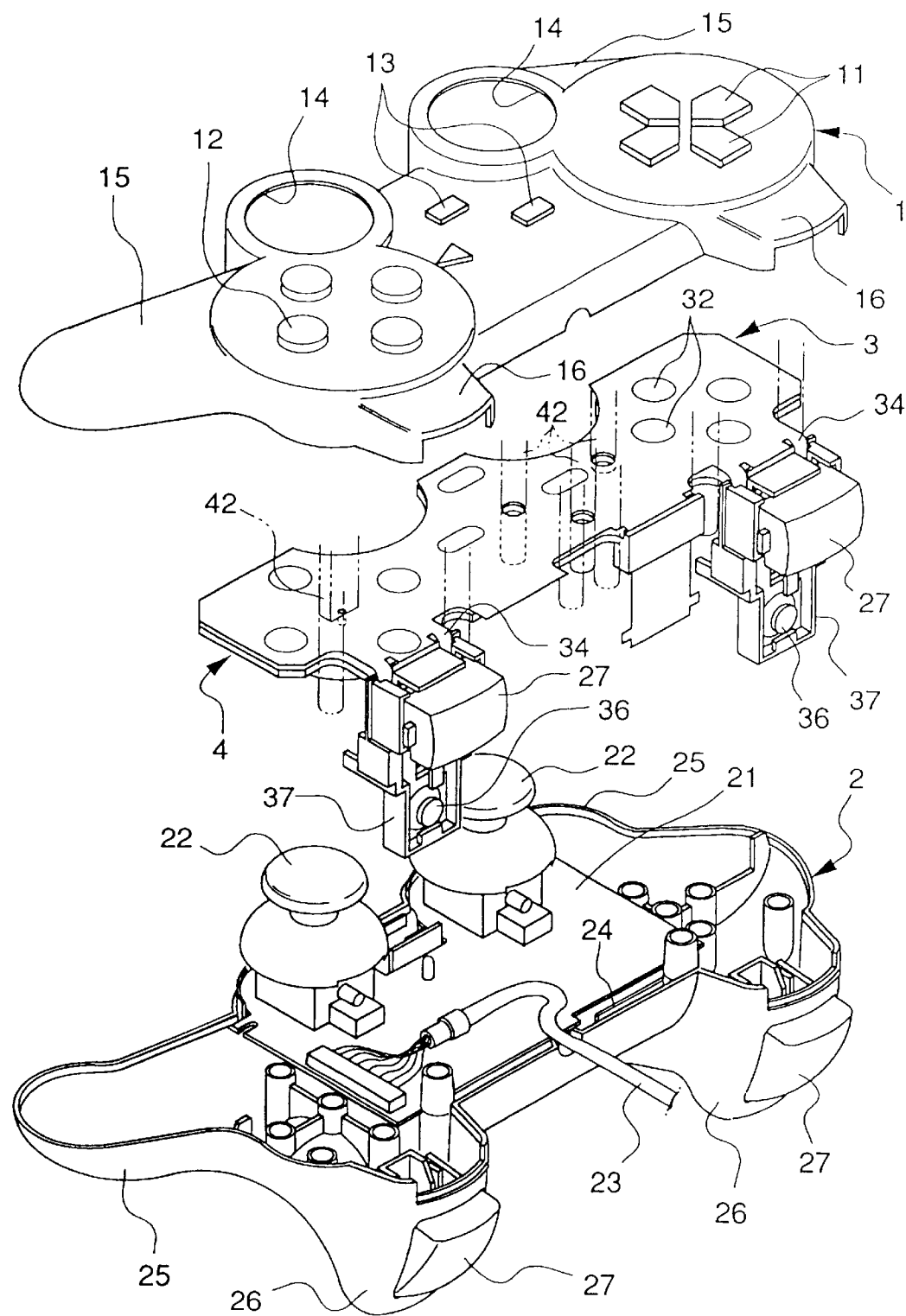
FIG. 2 is an exploded perspective view thereof.

FIG. 1 is a perspective view showing a controller for use in a computer game machine according to an embodiment of the present invention and FIG. 2 is an exploded perspective view thereof. In the same figures, the reference numeral 1 denotes an upper case (a first case member) which constitutes an upper side of a controller housing, the numeral 2 denotes a lower case (a second case member) which constitutes a lower side of the housing, numeral 3 denotes a flexible substrate (a filmy substrate having flexibility) which is received in an internal space defined by both upper and lower cases 1, 2, and numeral 4 denotes a plate (a fixing member) urging and fixing the flexible substrate to an inner surface of the upper case 1.

On an upper surface of the upper case 1 are provided cross keys (operating members) 11 at one end side of the upper surface, while at the opposite end side of the upper surface are provided four kinds of key tops (operating members) 12, with selection keys (operating members) 13 being disposed centrally. At end positions on the back side (player's side) of the upper surface of the upper case 1 are formed a pair of holes 14 for passing therethrough a pair of operating levers 22, which will be described later, and for projection therethrough of the head portions of the operating levers. On both sides of the holes 14 are formed semi-split members 15, respectively, so as to project to the back side. At both end positions on the front side (the side opposite to the player side) of the upper surface of the upper case 1 are formed projections 16 projecting forward and having a square U-shape in cross section.

Within the lower case 2 is mounted a printed circuit board 21. A pair of operating levers 22 are disposed on the printed circuit board 21 and a cable 23 for conveying signals from the printed circuit board 21 is connected to the same board. A connector 24 is connected to a front end portion of the printed circuit board 21. On both sides of the operating levers 22 are formed semi-split members 25, respectively, so as to project to the back side. The semi-split members 25, when combined with the semi-split members 15, define a hollow receptacle portion. At both front end positions of the lower case 2 are formed projections 26 for connection with the projections 16, with button keys 27 being attached to the projections 26 respectively.

Figure 3:
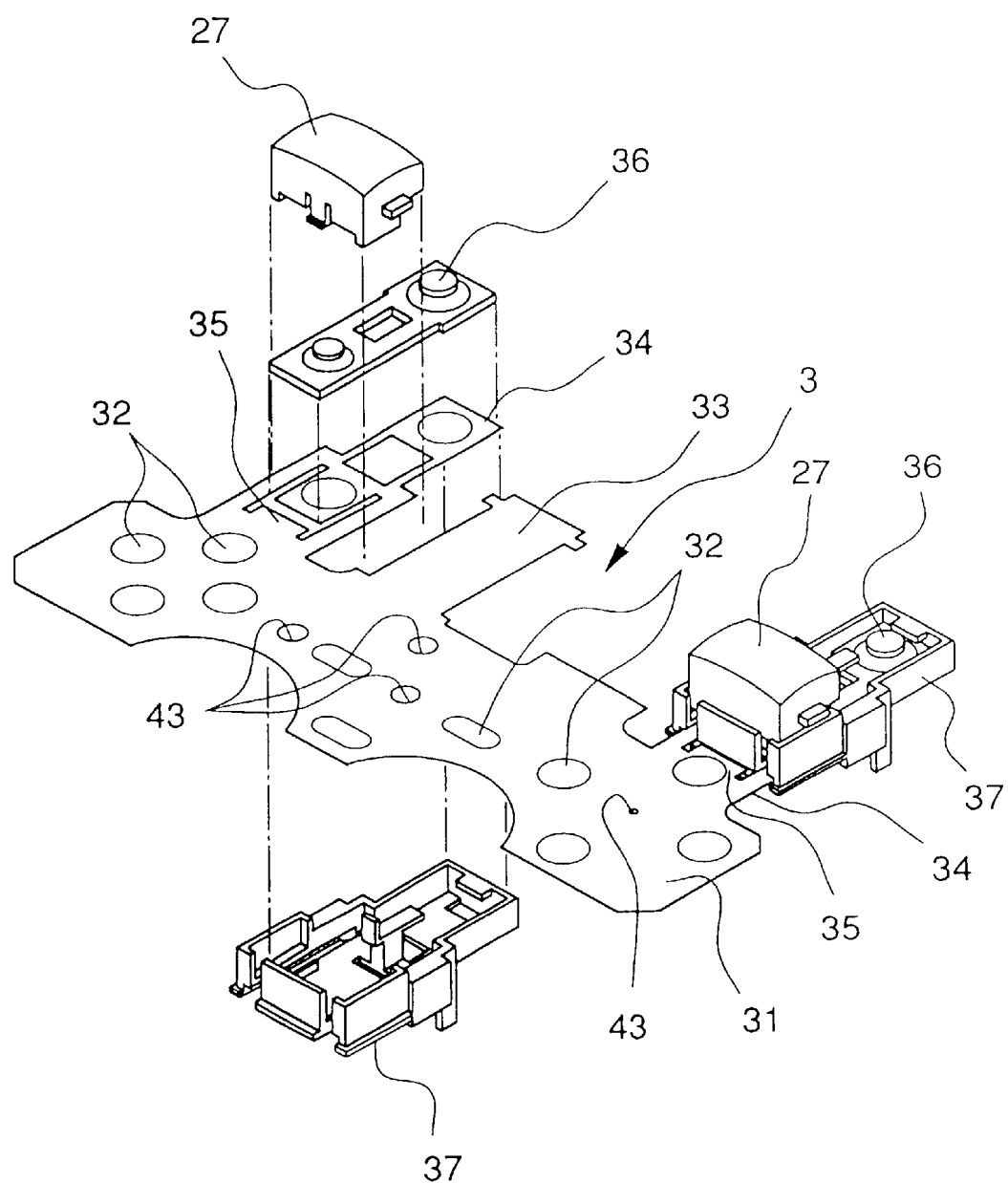
FIG. 3 is a perspective view of a flexible substrate used in the controller.

Predetermined wiring patterns (not shown) are formed on the flexible substrate 3. As shown in FIGS. 2 and 3, contact patterns 32 for performing ON-OFF operations in response to operations of the cross keys 11, key tops 12 and selection keys 13 on the upper case 1, are formed on an upper surface of a substrate body 31 at positions corresponding to those keys 11, 12 and 13. A nearly central portion of the front side of the substrate body 31 extends forward to form a tape wiring portion 33 for connection with the connector 24, and both front end portions of the substrate body 31 extend forward to form tape contact portions 34.

On the base side of each tape contact portion 34 is formed an H-shaped groove and on the back side of the groove is formed an anti-rebound lug 35 which projects forward. Two rubber contacts 36 are placed on each tape contact 34 and are fitted and fixed, together with the tape contact portion 34, into a holder (a support member) 37. Each button key 27 is fitted in the holder 37 so that it comes into contact with the rubber contact 36 located on the substrate body 31 side, and is operated ON and OFF.

Figure 4:
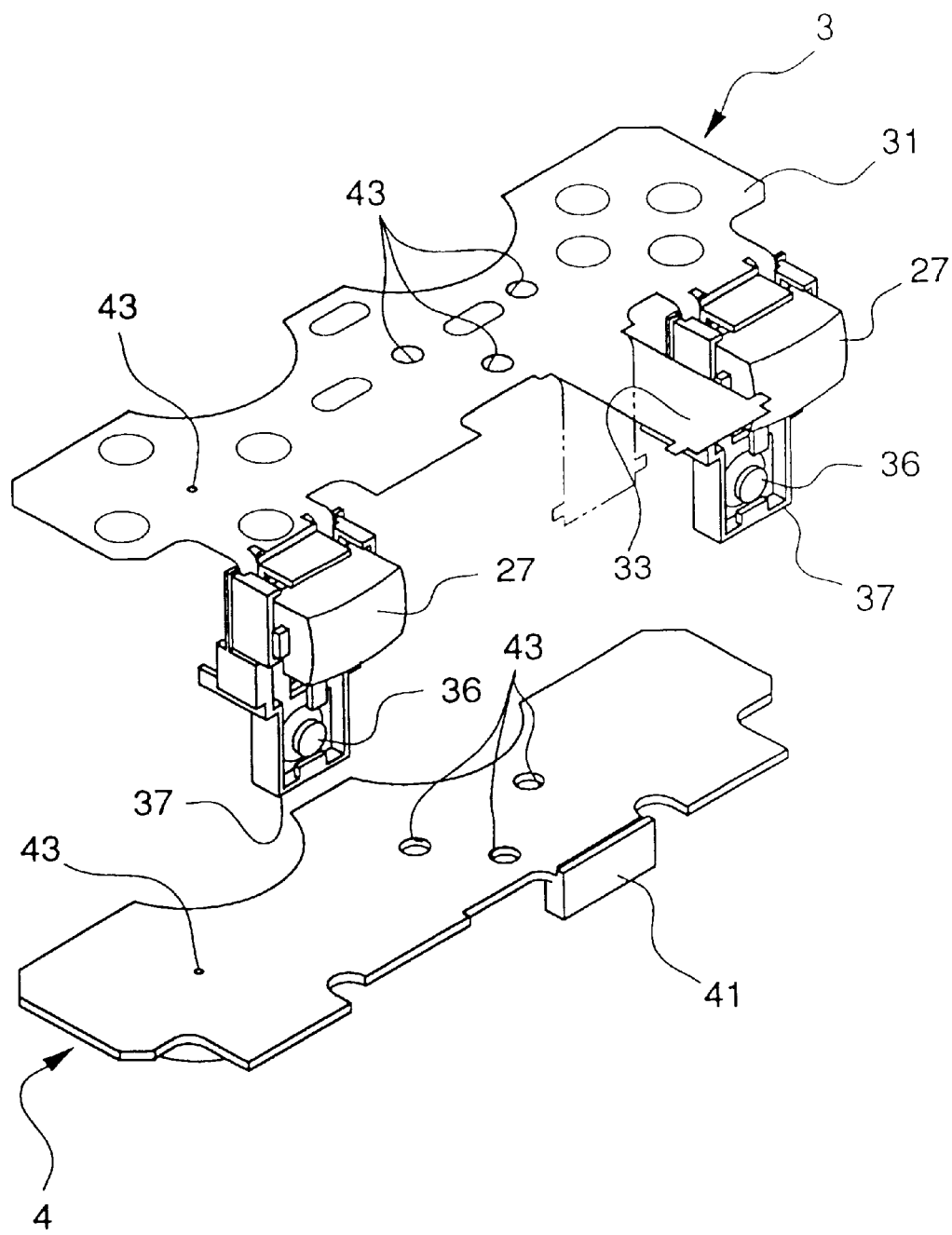
FIG. 4 is a perspective view showing a positional relation between the flexible substrate and a plate both used in the controller.

As shown in FIG. 4, when the holders are bent up perpendicularly to the substrate body 31, the lugs 35 fit in the undersides of the holders 37 to prevent rebound of the tape contact portions 34. Accordingly, the upright holders 37 are fitted in the projections 26 of the lower case 2, so that the button keys 26 are connected respectively to the rubber contacts 36 located on the side spaced apart from the substrate body 31 are ON-OFF operated.

The tape wiring portion 33 is supported vertically by being inserted into a slit formed in a wall portion 41 which is formed at a front end position of the plate 4 for the prevention of static electricity. A front end, (or a lower end), of the tape wiring portion 33 is inserted into the connector 24 of the lower case 2 and is thereby connected thereto electrically. The wall portion 41 is positioned at the connection between the upper case 1 and the lower case 2 to prevent the entry of static electricity from the exterior and thereby prevent the influence of static electricity on the tape wiring portion 33.

In both the substrate body 31 and the plate 4 are formed holes 43 for insertion therein of positioning pins (projections) 42 formed on the upper case 1 (represented schematically in FIG. 2).

For assembling the controller, first the printed circuit board 21 is fitted in the lower case 2 at a predetermined position and the cable 23 is extended to the exterior.

Then, the rubber contacts 36 are placed on the table contact portions 34 of the flexible substrate 3 and the holders 37 are fitted in the rubber contacts 36 and the tape contact portions 34. Further, the button keys 27 are fitted in the holders 37, respectively.

Thereafter, the holders 37 are bent up perpendicularly to the substrate body 31 and the lugs 35 are inserted into the undersides of the holders 37, whereby the holders 37 are held perpendicularly to the substrate body 31 and thus rebound is not likely to occur at all.

Next, the tape wiring portion 33 is inserted into the slit formed in the support plate 41 of the plate 4 and the plate 4 is brought into close contact with the substrate body 31, thereby allowing the tape wiring portion 33 to project in the same direction as the erected holders 37.

Then, the holes 43 of the substrate body 31 and the plate 4 are fitted on the positioning pins 42 of the upper case 1 and the flexible substrate 3 is pressed against the inner surface of the upper case 1 by the plate 4.

Subsequently, the upper case 1, with the flexible substrate 3 and the plate 4 accommodated therein, is integrally fitted with the lower case 2.

In this way it is possible to assemble the controller.

When the cross keys 11, key tops 12, selection keys 13 and button keys 27 in the controller are operated, signals corresponding to the operations are inputted from the flexible substrate 3 to the computer game machine through the tape wiring portion 33, printed circuit board 21 and cable 23.

According to the controller of this embodiment, as described above, since the flexible substrate 3 is used, the controller can be reduced in thickness and weight as compared with the conventional controller and therefore it is possible to attain a reduction in size, thickness and weight of the entire device.

Besides, the use of a single flexible substrate 3 permits a decrease in the number of electric connections as compared with the prior art and thereby permits an improvement in reliability.

Moreover, since pins 42 for positioning and fixing the flexible substrate 3 and the plate 4 are formed on the upper case 1 and holes 43 for insertion therein of the pins 42 are formed in the substrate body 31 and the plate 4, it is possible to easily effect positioning and fixing of the flexible substrate 3 and the plate 4, and it is unlikely that there will occur a positional deviation of the flexible substrate 3 and the plate 4.

Further, since lugs 35 for the prevention of rebound are formed on the base sides of the tape contact portions 34, it is possible to prevent rebound of both tape contact portions 34 and holders 37.

Further, since there is adopted a construction wherein the tape contact portions 34 are fitted in the holders 37 together with the rubber contacts 36, it is possible to support the tape contact portions 34 perpendicularly to the substrate body 31.

Further, since the tape wiring portion 33 is inserted into a slit formed in the wall portion 41 which is provided at a front end position of the plate 4, it is possible to prevent the influence of static electricity on the tape wiring portion 33 and hence it is possible to prevent a malfunction caused by static electricity.

Although the controller according to an embodiment of the present invention has been described above, the present invention is not limited to the above embodiment and various modifications of design may be made within the scope of the invention. For example, the number and quantity of the positioning pins 42 formed on the upper case 1 and of the holes 43 formed in both substrate body 31 and plate 4 may be changed as desired.

Similarly, the position of the wall portion 41 is not limited to a front end portion of the plate 4, but may be provided near the opening of the upper case 1 or of the lower case 2.

What is claimed is:

1. An input device for inputting signals to a game machine which uses a computer, said input device comprising:

one or more operating members provided on an outside of a plurality of surfaces of a housing;

a flexible filmy substrate disposed within said housing, said substrate being bent in conformity with an inside of said plurality of surfaces of said housing;

contact portions adapted to perform ON-OFF operations in response to operations of said operating members formed respectively on one or more surfaces of said substrate at positions corresponding to the operating members; and a printed circuit board disposed within said housing, said printed circuit board being connected to said game machine by a cable;

wherein said substrate comprises a flexible tape wiring portion, said tape wiring connecting said substrate to said printed circuit board, wherein said housing is configured be held between a left and right palm of a user's hands, and said operating members are configured to be simultaneously manipulated by a plurality of digits on said user's hands, and wherein when said operating members are operated, signals corresponding respectively to operations of the operating members are generated by the printed circuit board in response to the ON-OFF operations of the contact portions of said substrate and are inputted to the game machine through the cable.

2. An input device for a game machine according to claim 1, wherein a positioning means for positioning said substrate is provided on an inner surface of said housing.

3. An input device for a game machine according to claim 2, wherein said positioning means comprises one or more projections formed on the inner surface of said housing, and holes for insertion therein of said projections are formed in said substrate at positions corresponding to said projections.

4. An input device for a game machine according to claim 1, including a fixing member for urging and fixing said substrate to the inner surface of said housing.

5. An input device for a game machine according to claim 4, wherein any one of said housing, said filmy substrate having flexibility and said fixing member is removably provided with support members which support one or more bent surfaces of said substrate substantially perpendicular to other surfaces adjacent thereto.

6. An input device for a game machine according to claim 5, wherein said other surfaces of the substrate are formed with anti-rebound lugs extending toward a lower portion of one or more bent surfaces of the substrate and toward a lower portion of said support members for supporting the bent surfaces.

7. An input device for a game machine according to claim 1, a, wherein said housing comprises a first case member and a second case member which are divided from each other, and a wall portion for preventing the influence of static electricity on the tape wiring portion of said substrate is provided inside the housing at a connection between said first and second case members.

8. An input device for a game machine according to claim 2, including a fixing member for urging and fixing said substrate to the inner surface of said housing.

9. An input device for a game machine according to claim 3, including a fixing member for urging and fixing said substrate to the inner surface of said housing.

10. An input device for a game machine according to claim 8, wherein any one of said housing, said filmy substrate having flexibility and said fixing member is removably provided with support members which support one or more bent surfaces of said substrate substantially perpendicular to other surfaces adjacent thereto.

11. An input device for a game machine according to claim 9, wherein any one of said housing, said filmy substrate having flexibility and said fixing member is removably provided with support members which support one or more bent surfaces of said substrate substantially perpendicular to other surfaces adjacent thereto.

12. An input device for a game machine according to claim 10, wherein said other surfaces of the substrate are formed with anti-rebound lugs extending toward a lower portion of one or more bent surfaces of the substrate and toward a lower portion of said support members for supporting the bent surfaces.

13. An input device for a game machine according to claim 11, wherein said other surfaces of the substrate are formed with anti-rebound lugs extending toward a lower portion of one or more bent surfaces of the substrate and toward a lower portion of said support members for supporting the bent surfaces.

14. An input device for a game machine according to claim 1, wherein a pair of control members are mounted on said printed circuit board, each of said control members being configured to be manipulated by a thumb on the user's hands.

15. An input device for a game machine according to claim 1, wherein the housing comprises an upper surface and a forward surface, said forward surface being substantially perpendicular to said upper surface, said plurality of operating members being provide on both the upper surface and the forward surface of the housing, further wherein the operating members provided on the forward surface each comprise a button key and a key holder positioned on opposite sides of the substrate.

16. An input device for a game machine according to claim 15, wherein the operating members provided on the forward surface of the housing each further comprise a rubber contact positioned between the button key and the substrate.

17. An input device for a game machine according to claim 15, wherein the substrate is provided with an anti-rebound lug formed adjacent to each of the operating members provided on the forward surface of the housing, said anti-rebound lug configured to engage said key holder so as to maintain a substantially right-angle bend in the substrate.

18. An input device for a game machine according to claim 17, wherein, said anti-rebound lug comprises an outwardly extending portion of said substrate that engages a rear surface of said key holder, said outwardly extending portion being formed by an H-shaped groove provided in said substrate.

19. An input device for inputting signals to a game machine which uses a computer, said input device comprising:

a housing having an upper surface and a forward surface, said housing being configured to be held between a left palm and a right palm of a user's pair of hands with the forward surface facing away from said user;

a pair of control members disposed on the upper surface of the housing, said upper operating members being configured to be manipulated by thumbs on the user's hands;

a plurality of upper operating buttons disposed on the upper surface of the housing, said upper operating buttons being configured to be manipulated by the thumbs on the user's hands;

a plurality of forward operating buttons disposed on the forward surface of the housing, said forward operating buttons being configured to be manipulated by fingers on the user's hands;

a printed circuit board disposed within said housing, said pair of control members being disposed on said printed circuit board;

a cable connecting said printed circuit board to said game machine by a cable;

a flexible filmy substrate disposed within said housing, said substrate having a horizontal surface that is disposed against an interior plane of the upper surface of the housing and a vertical surface that is disposed against an interior plane of the forward surface of the housing, said substrate comprising a bend along the juncture of the horizontal surface and the vertical surface, said bend being maintained by an antirebound lug formed by a portion of said substrate;

a plurality of contact portions formed on said substrate, said contact portions being formed on the vertical surface of the substrate at positions corresponding to the upper operating buttons, and on the horizontal surface of the substrate at positions corresponding to the forward operating buttons, said contact portions being configured to perform ON-OFF operations in response to operation of the upper and forward operating buttons; and a flexible tape wiring portion extending from said substrate, said tape wiring connecting said substrate to said printed circuit board;

wherein when said upper and forward operating buttons are manipulated by the user's fingers, signals corresponding to the operation of the upper and forward operating buttons are generated by the ON-OFF operations of the contact portions of said substrate, are transferred from the substrate to the printed circuit board through the tape wiring portion, and are inputted to the game machine through the cable, and wherein when said control members are manipulated by the user's thumbs, signals corresponding to the operation of the operating members are generated by the printed circuit board, and are inputted to the game machine through the cable.

20. An input device for a game machine according to claim 19, wherein the plurality of forward operating buttons each comprise a button key and a key holder positioned on opposite sides of the vertical surface of the substrate, and said anti-rebound lug comprises outwardly extending portion of said substrate that engages a rear surface of said key holder, said outwardly extending portion being formed by an Hshaped groove provided in said substrate at the bend along the juncture of the horizontal surface and the vertical surface.

* * * * *

UNITED STATES PATENT AND TRADEMARK OFFICE
CERTIFICATE OF CORRECTION

PATENT NO. : 6,342,009 B1
DATED : January 29, 2002
INVENTOR(S) : Masahiro Soma

It is certified that error appears in the above-identified patent and that said Letters Patent is hereby corrected as shown below:

Column 6,
Line 17, after "configured" insert -- to --.
Line 52, delete "a," before "wherein".

Column 7,
Line 29, delete "provide" and substitute -- provided -- in its place.

Column 8,
Line 22, delete "antirebound" and substitute -- anti-rebound -- in its place.
Line 57, delete "Hshaped" and substitute -- H-shaped -- in its place.

Signed and Sealed this

Twenty-seventh Day of August, 2002

Attest:

JAMES E. ROGAN
Attesting Officer   Director of the United States Patent and Trademark Office